US005798688A

United States Patent [19]
Schofield

[11] Patent Number: 5,798,688
[45] Date of Patent: Aug. 25, 1998

[54] INTERIOR VEHICLE MIRROR ASSEMBLY HAVING COMMUNICATION MODULE

[75] Inventor: Kenneth Schofield, Holland, Mich.

[73] Assignee: Donnelly Corporation, Holland, Mich.

[21] Appl. No.: 796,051

[22] Filed: Feb. 7, 1997

[51] Int. Cl.⁶ .................. B60Q 1/00; H04B 1/034
[52] U.S. Cl. ............. 340/438; 362/83.1; 359/843; 455/99; 455/90
[58] Field of Search .................. 340/438, 461, 340/469, 815.41; 362/83.1; 359/838, 839, 843, 844; 455/90, 99, 100, 128, 575

[56] References Cited

U.S. PATENT DOCUMENTS

| | | | |
|---|---|---|---|
| 5,253,109 | 10/1993 | O'Farrell et al. | 359/604 |
| 5,327,288 | 7/1994 | Wellington et al. | 359/606 |
| 5,382,780 | 1/1995 | Carmen | 235/384 |
| 5,521,760 | 5/1996 | De Young et al. | 362/83.1 |
| 5,530,240 | 6/1996 | Larson et al. | 359/839 |
| 5,572,354 | 11/1996 | Desmond et al. | 359/871 |
| 5,576,687 | 11/1996 | Blank et al. | 362/83.1 |
| 5,649,317 | 7/1997 | Suzuki | 455/90 |
| 5,649,756 | 7/1997 | Adams et al. | 362/83.1 |
| 5,669,698 | 9/1997 | Veldman et al. | 362/83.1 |
| 5,671,996 | 9/1997 | Bos et al. | 362/83.1 |
| 5,673,994 | 10/1997 | Fant, Jr. et al. | 362/83.1 |
| 5,708,410 | 1/1998 | Blank et al. | 340/438 |

*Primary Examiner*—Donnie L. Crosland
*Attorney, Agent, or Firm*—Van Dyke, Gardner, Linn & Burkhart, LLP

[57] ABSTRACT

A vehicle interior mirror assembly for use with a vehicle having a communication system, such as a keyless entry system, global positioning system navigational system or remote garage door opener includes a reflective element, a case for the reflective element, a manual actuator for adjusting the position of the reflective element and an electromagnetic communication module. The communication module is supported within the case by the manual actuator. In this manner, the structure of the mirror assembly and the production process for assembling the mirror assembly can be substantially identical between mirror assemblies including a communication module and mirror assemblies without a communication module.

21 Claims, 2 Drawing Sheets

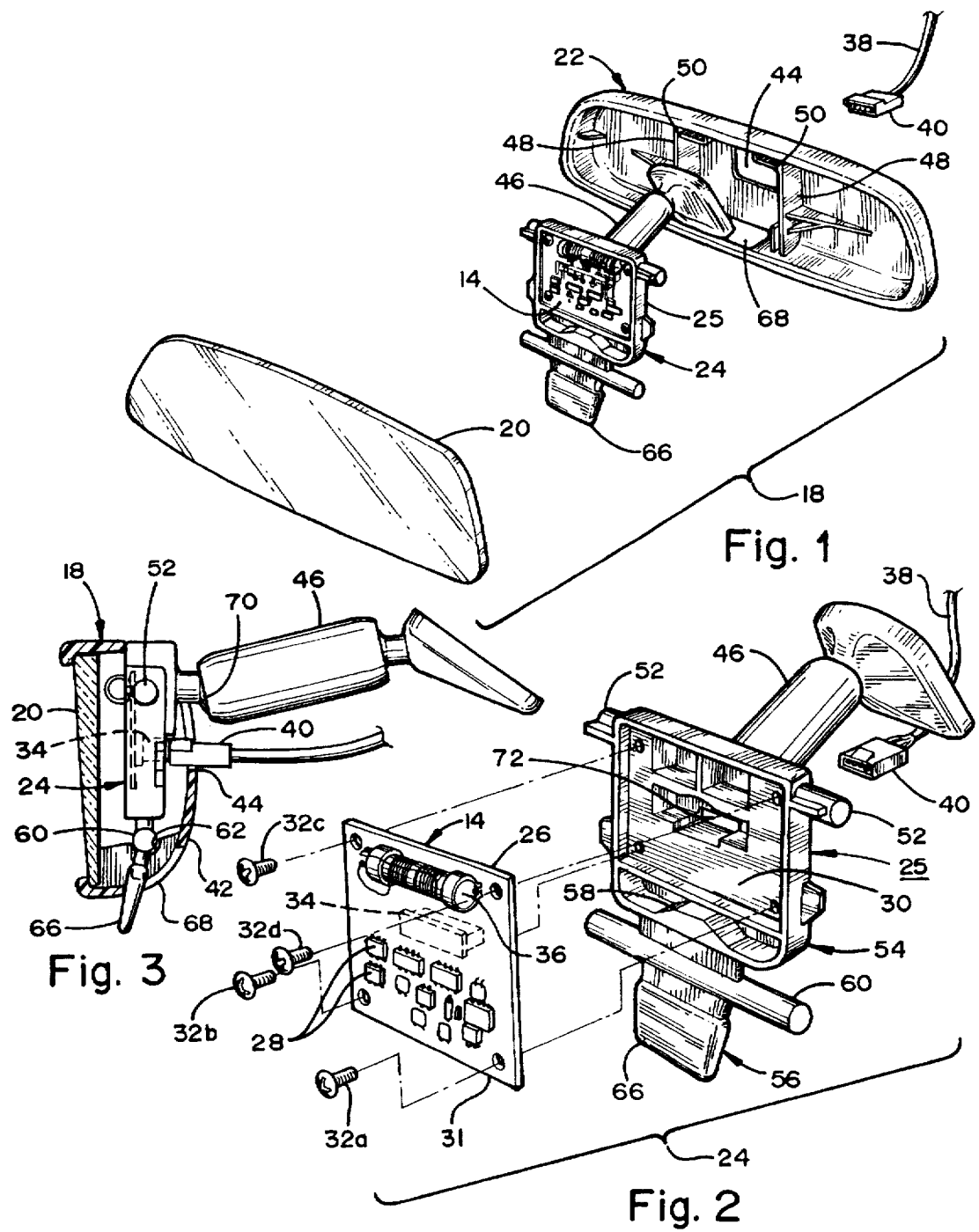

INTERIOR VEHICLE MIRROR ASSEMBLY HAVING COMMUNICATION MODULE

BACKGROUND OF THE INVENTION

This invention relates generally to a vehicle electronic system and, more particularly, to a vehicle electronic system having an electromagnetic communication module.

Particular vehicle electronic systems include an electromagnetic communication module in order to communicate with a remotely located device. One such system is a keyless entry system in which a remote transmitter is operated by the driver in order to lock or unlock the vehicle doors. Such keyless entry system requires a receiving electromagnetic communication module, typically including an antenna and a first stage amplifier in order to receive and buffer the transmitted signal. A decoder may also be provided in order to decode the received signal and respond only if a proper signal protocol is received. The keyless entry receiver communication module is typically mounted in a convenient location, such as a housing mounted to the firewall or other portion of the vehicle body. One problem with positioning the module on the vehicle body is distortion of the received electromagnetic signal by metal in the vehicle body. As a result, uniformity of detection of the transmitted signal may be less than desirable. Some of the deficiencies of positioning the keyless entry receiver communication module on the vehicle body may be overcome by positioning it, for example, in the exterior rearview mirror of the vehicle. While such location ensures uniformity of detection from all directions, it is typically necessary to provide separate keyless entry receiver module in both exterior rearview mirrors located on both sides of the vehicle. This results in undesirable duplication of the communication module.

It is known to provide electrical and electronic components within the casing of an interior rearview mirror assembly. For example, electro-optic rearview mirrors typically incorporate one or preferably two light sensors in order to sense light levels in the vicinity of the vehicle. It is also known to mount courtesy lights and associated switches in the casing of an interior rearview mirror assembly. When such electrical or electronic components are positioned within the casing of an interior rearview mirror assembly, they are typically mounted to a circuit board which, in turn, is mounted to the mirror casing. The mounting of the electrical or electronic components to the mirror assembly casing is not without its difficulties. Modifications must be made to the casing in order to accommodate the electrical/electronic components. In order to provide the capability of manufacturing both standard mirror assemblies, without the electrical/electronic components, the mirror inventory of both the modified and unmodified casings must be stocked at the factory. Also, changes in the assembly process of the mirror assembly are required in order to incorporate the electrical or electronic feature. While the additional costs of carrying inventory and modifying the assembly process is not particularly onerous for low-volume, high-price point mirror assemblies, it becomes more prohibitive for high-volume, low-price point mirror assemblies, such as manual "flip" mirrors. A manual flip mirror utilizes a prismatic reflective element and a manual actuator for adjusting the position of the reflective element between day and night viewing positions. Such flip mirror assemblies are common in vehicles and sell in very large quantities at highly competitive price points. Accordingly, incorporation of electrical and electronic devices in such flip mirrors has not been practical.

SUMMARY OF THE INVENTION

The present invention provides an ideal technique for incorporating an electromagnetic communication module, such as a keyless entry receiver, or the like, in a vehicle. This is accomplished, according to an aspect of the invention, by providing a vehicle interior rearview mirror assembly having a case, a reflective element in the case and a manual actuator including a user operable grasp handle for adjusting the position of the reflective element between day and night viewing positions. An electromagnetic communication module is supported within the case by the manual actuator.

Because the communication module is supported by the manual actuator, no additional modifications are required in the mirror assembly in order to accommodate the communication module. This is advantageous, particularly in the manufacturing of high-volume, low-price point mirror assemblies, because only one type of casing needs to be stocked in inventory and the same assembly process can be utilized to manufacture mirror assemblies both with and without the communication module. This provides exceptional flexibility in the incorporation of optional equipment in the vehicle while minimizing the cost of adding the optional equipment. This is accomplished because the provision of an electromagnetic communication module merely requires the selection of a manual actuator incorporating the communication module. Likewise, the manufacturing of a mirror assembly without the optional equipment merely requires the selection of a manual actuator not incorporating the electromagnetic communication module. Indeed, the manual actuator could otherwise be identical between the two versions of the mirror.

Because of the exceptional flexibility provided by the invention, the incorporation of electromagnetic communication modules in vehicles can be readily adapted to different communication standards of various countries. This is because manual actuators can be inventoried having communication modules configured to the communication standards of each of the countries in which it is desired to market a mirror assembly incorporating the electromagnetic communication module.

The present invention additionally provides a uniform detection of transmission, or reception, of communication signals between the interior rearview mirror assembly positioned in an area of the vehicle which is relatively free from interfering magnetic members irrespective of the direction of transmission or reception of the electromagnetic signals. Although the invention is described particularly for use with keyless entry receivers, it finds application in other electromagnetic communication modules such as a global positioning system receiver, a garage door opener transmitter, a smart warning system signal receiver, an intelligent vehicle highway system signal receiver, and the like.

These and other objects, advantages and features of this invention will become apparent upon review of the following specification in conjunction with the drawings.

BRIEF DESCRIPTION OF THE DRAWINGS

FIG. 1 is an exploded perspective view of a vehicle interior rearview mirror assembly, according to the invention;

FIG. 2 is an exploded perspective view of a manual actuator assembly, according to the invention;

FIG. 3 is a side sectional elevation of the interior rearview mirror assembly in FIG. 1;

DESCRIPTION OF THE PREFERRED EMBODIMENT

Figure 4:
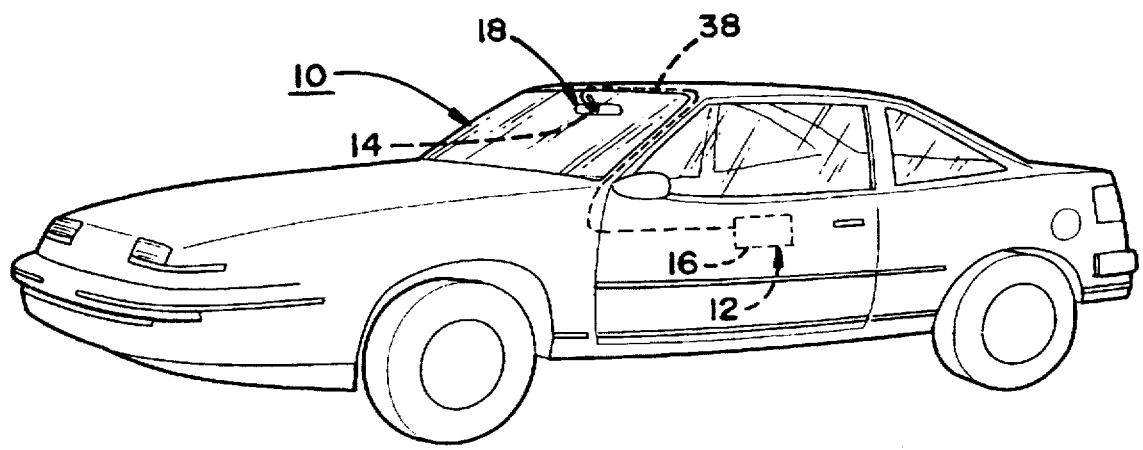
FIG. 4 is a side elevation of a vehicle incorporating the invention.
Figure 5:
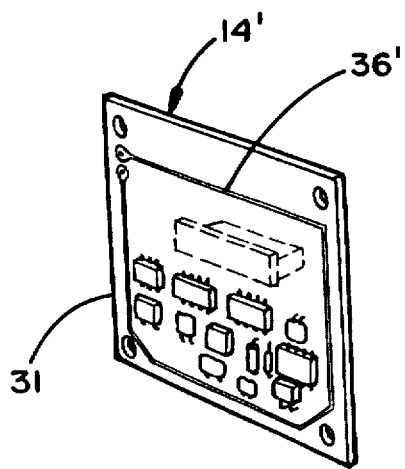
FIG. 5 is a perspective view similar to FIG. 2 of an alternative embodiment.

Referring now specifically to the drawings, and the illustrative embodiments depicted therein, a vehicle 10 incorporates an electronic system 12, such as a keyless entry system (FIG. 4). In the case of a keyless entry system, electronic system 12 is responsive to an electromagnetic signal, such as an RF signal, transmitted from a remote device (not shown) carried by the driver as received by a communication module 14 and as decoded in a primary control module 16. In the illustrated embodiment, primary control module 16 is illustrated as being positioned in the vehicle door in order to lock and unlock the vehicle's doors in response to signals from the remote transmitter. However, primary electronic module 16 could be positioned in other portions of the vehicle besides the door. Additionally, electronic system 12 could be a global positioning system navigational aide or the like, in which case, communication module 14 would be a global positioning system receiver which is responsive to signals generated from global positioning system satellites as is known in the art. If electronic system 12 is an automatic garage door opener, communication module 14 would be a garage door opener transmitter. Other examples of electronic systems in which a communication module may be adapted would suggest themselves to those skilled in the art. For example, the communication module may be used as part of an auto-toll collection system in which the communication module transmits signals to and/or receives signals from a toll booth. The communication module could also be of the type which responds to smart warning system (SMS) signals in order to warn of upcoming traffic conditions, hazards, or the like. The communication module could also transmit signals to and/or receive signals from other intelligent vehicle highway system devices.

Communication module 14 is positioned in a vehicle interior rearview mirror assembly 18 (FIGS. 1–3). Rearview mirror assembly 18 includes a reflective mirror element 20 and a case, or shell, 22 for the mirror element. A manual actuator 25 is provided in order to position reflective mirror element 20 between day and night viewing positions. Communication module 14, which is made up of a printed circuit board 26 and one or more electronic components 28 mounted to the circuit board, is adapted to be positioned within a cavity 30 of manual actuator 25 to provide a manual actuator assembly 25. Although illustrated positioned within a cavity of the manual actuator, communication module 14 could be mounted to an external surface or other portion of the manual actuator. Circuit board 26 is preferably a conventional printed circuit board and includes a series of metal traces (not shown) deposited on a substrate 31. Substrate 31, as is known in the art, may be a glass fiberboard and is attached to manual actuator 24 by a plurality of fasteners 32a–32d. Substrate 31 may also be a flexible polymeric substrate in order to conform to any configuration of cavity 30. Communication module 14 could be fabricated from other known materials, such as potted assemblies, hybrid circuits, or the like. Communication module 14 preferably additionally includes a connector 34 mounted to circuit board 26 in order to provide connectivity to other portions of the vehicle, such as electronic system 12.

Although the particular selection and interconnection of electronic components 28 will vary upon application, communication module 14 will preferably include at least the first amplification stage for communication modules that are receivers, and at least the final driving stage for communication modules that are transmitters. Of course, communication module 14 could be a combined transmitter and receiver, or transceiver, for particular applications. One of electronic components 28 is preferably a receiving or transmitting antenna. In the illustrated embodiment, an antenna 36' is a discrete coil-wound antenna which is mounted to circuit board 26 along with other components 28. Alternatively, a communication module 14' may be provided in which an antenna 36' is formed of one or more metallic traces integral with circuit board 26 as is known in the art. Although illustrated as a loop, antenna 36' may be formed in a serpentine or other shape. Alternatively, the antenna may be an elongated wire antenna, or string antenna, which may be incorporated in a wire bundle 38 interconnected with connector 34 of communication module 14 by a connector 40 in a manner which will be described in more detail below. Although, in most applications, it is expected that any decoding or encoding circuitry will be incorporated in the primary electronic module 16, it would additionally be possible to incorporate such decoding or encoding circuitry in communication module 14.

Except as modified in order to accommodate communication module 14, manual actuator 25 is conventional and forms no part of the present invention. Reflective mirror element 20, case 22 and manual actuator 25 make up a low-price point manual "flip" mirror of the same general type disclosed in U.S. Pat. No. 5,521,760 issued to De Young et al. for an ENERGY ABSORBING REARVIEW MIRROR ASSEMBLY and in U.S. Pat. No. 5,327,288 issued to Wellington et al. for a REDUCED VIBRATION DAY/NIGHT REARVIEW MIRROR ASSEMBLY, the disclosures of which are hereby incorporated herein by reference. The details of interior rearview mirror assembly 18 are disclosed in detail in the '288 and '760 patents and will not be repeated herein. Suffice it to say, case 22 is a shell of generally hollow construction and is preferably a single-piece mirror case molded from a thermoplastic material, such as a polypropylene or a glass-filled nylon. Case 12 has a back wall 42 with a mounting aperture 44 generally centered along the case length in back wall 42. A mounting arm 46 extends through mounting aperture 44 for mounting mirror assembly 18 to vehicle 10. Mounting aperture 44 has two opposing sides which are generally defined by a pair of structural webs 48. Structural webs 48 include upper portions 50 which provide bearing surfaces (not shown) for rotatably supporting pivot axles 52 on actuator 25.

Manual actuator 25 includes a toggle member 54 and a pivot lever 56 also preferably molded of a thermoplastic material, such as 13 percent glass-filled nylon. Toggle member 54 has a resilient pivot journal 58 defined at a lower portion thereof in order to receive an upwardly extending tongue (not shown) of pivot lever 56. Resilient pivot journal 58 remains slightly deflected in each of the day and night positions to assert a force between toggle member 54 and pivot lever 52 for biasing actuator 25 toward, and holding actuator 25 in, one of the day and night positions. Pivot lever 56 includes a pivot shaft 60, which extends in opposite directions therefrom, which is pivotally supported by bearing surfaces 62 in lower portions 64 of structural web 48. Pivot lever 56 additionally includes a grasp handle 66 which extends through an aperture 68 in case 22 in order to allow the operator, namely the vehicle driver, to pivot pivot lever 56 about pivot shaft 60.

Manual actuator 25 is snapped into case 22 by inserting pivot axle 52 in the bearing surfaces of upper portion 50 and pivot shaft 60 into bearing surfaces 62. Once assembled in this fashion, mirror element 20 is mounted to case 22 utilizing conventional assembly techniques. Once assembled, movement of grasp handle 66 causes pivoting of pivot lever 56 which pivots mirror element 20 and case 22 with respect to toggle member 54 which remains relatively stationary with respect to the vehicle.

Manual actuator 25 includes a zinc die-cast mounting ball 70 which is received in a socket (not shown) in mounting arm 46. Manual actuator 25 includes an aperture 72 defined in toggle member 54 which is aligned with connector 34 and aperture 44 in case 22. This allows interconnectivity between communication module 14 and electronic system 12 by inserting connector 40 of wire bundle 38 through apertures 44 and 72 in order to make electrical interconnection with connector 34. The connectors may be configured in order to be mechanically locked once interconnected in this manner, in order to prevent disconnection of the communication module from the rest of the vehicle electronic system 12 due to vibration or the like. In this manner, electrical connectivity is provided to communication module 14 without requiring modification to case 22. This is accomplished by utilizing the same aperture through which the mounting arm of the mirror assembly is passed in order to pass the electrical wiring between the communication module and the primary electronic module.

Although the invention provides exceptional flexibility in the original equipment manufacture (OEM) of vehicle mirror assemblies, its principles may additionally be applied to aftermarket sales of mirror assemblies. Although the invention is described for use with a radio frequency communication module, its principles could be applied to other electromagnetic communication media such as infrared light and the like.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A vehicle interior rearview mirror assembly, comprising:
   a reflective element;
   a case for said reflective element;
   a manual actuator including a user operable grasp handle for adjusting the position of said reflective element between day and night viewing positions; and
   an electromagnetic communication module supported within said case by said manual actuator.

2. The mirror assembly in claim 1 wherein said communication module includes a printed circuit board including a metal layer defining an antenna and a circuit for processing signals received or transmitted by said antenna.

3. The mirror assembly in claim 1 wherein said communication module includes a printed circuit board supporting a discrete coil antenna and a circuit for processing signals received or transmitted by said antenna.

4. The mirror assembly in claim 1 wherein said communication module includes a printed circuit board having a circuit and is adapted for connection with a string antenna extending from said printed circuit board wherein said circuit processes signals received or transmitted by said antenna.

5. The mirror assembly in claim 1 wherein said case includes an edge defining an opening and said communication module includes a connector aligned with said opening.

6. The mirror assembly in claim 5 wherein said actuator is supported by a mounting arm which is adapted for connection adjacent a vehicle windshield and said mounting arm passes through said opening.

7. The mirror assembly in claim 1 wherein said communication module is one of a keyless entry receiver, a global positioning system receiver, a garage door opener transmitter, a smart warning system signal receiver and an intelligent vehicle highway system signal receiver.

8. The mirror assembly in claim 1 in combination with a vehicle having a keyless entry system wherein said communication module is a keyless entry receiver interconnected with said keyless entry system.

9. The mirror assembly in claim 1 wherein said manual actuator includes a stationary toggle member and a pivot lever pivotally joined with said toggle member and supporting said grasp handle wherein pivotal movement of said pivot lever modifies the position of said reflective element with respect to said toggle member.

10. The mirror assembly in claim 9 wherein said communication module is mounted to said toggle member.

11. A vehicle interior rearview mirror assembly for use with a vehicle having a communication system comprising:
    a case having a first aperture on a lower surface thereof and a second aperture on a rear surface thereof;
    a manual actuator including a toggle member and a pivot lever, the pivot lever including a user operable grasp handle for adjusting the position of the case with respect to the toggle member, said grasp handle extending through said first aperture;
    a mounting arm extending through said second aperture for mounting said toggle member to a vehicle;
    a reflective element mounted to said case; and
    an electromagnetic communication module mounted to said toggle member and adapted to be interconnected with a communication system of the vehicle.

12. The mirror assembly in claim 11 wherein said communication module includes an electrical connector aligned with said second aperture in order to interconnect said communication module with the communication system of the vehicle.

13. The mirror assembly in claim 12 wherein said communication module is positioned on a side of said toggle member opposite said mounting arm and wherein said toggle member includes an aperture aligned with said electrical connector.

14. The mirror assembly in claim 13 wherein said toggle member includes a recessed portion and wherein said communication module is positioned in said recessed portion.

15. The mirror assembly in claim 12 wherein said communication system includes another electrical connector adapted to be locked to said electrical connector in order to prevent separation of said electrical connectors.

16. The mirror assembly in claim 11 wherein said toggle member includes a recessed portion and wherein said communication module is positioned in said recessed portion.

17. The mirror assembly in claim 11 wherein said communication module includes a printed circuit board, including a metal layer defining an antenna, and a circuit for processing signals received or transmitted by said antenna.

18. The mirror assembly in claim 11 wherein said communication module includes a printed circuit board supporting a discrete coil antenna and a circuit for processing signals received or transmitted by said antenna.

19. The mirror assembly in claim 11 wherein said communication module includes a printed circuit board having a circuit and is adapted for connection with a string antenna extending from said printed circuit board, wherein said circuit processes signals received or transmitted by said antenna.

20. The mirror assembly in claim 11 wherein said communication module is one of a keyless entry receiver, a global positioning system receiver, a garage door opener transmitter, a smart warning system signal receiver and an intelligent vehicle highway system signal receiver.

21. The mirror assembly in claim 11 wherein said communication system is a keyless entry system and wherein said communication module is a keyless entry receiver.

* * * * *